United States Patent
Mimura (10) Patent No.: US 10,042,301 B1
(45) Date of Patent: Aug. 7, 2018

(54) IMAGE PROCESSING APPARATUS AND INFORMATION PROVIDING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinichi Mimura, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/467,077

(22) Filed: Mar. 23, 2017

(30) Foreign Application Priority Data

Feb. 7, 2017 (JP) ................ 2017-020373

(51) Int. Cl.
*G03G 15/00* (2006.01)
(52) U.S. Cl.
CPC ............... *G03G 15/5016* (2013.01)
(58) Field of Classification Search
CPC ................................ G03G 15/5016

USPC ........................................... 399/81
See application file for complete search history.

(56) References Cited

U.S. PATENT DOCUMENTS

| | | | |
|---|---|---|---|
| 2005/0226641 A1* | 10/2005 | Ando | G03G 15/00 399/8 |
| 2005/0254850 A1* | 11/2005 | Bardolatzy | G03G 15/00 399/81 |
| 2008/0003010 A1* | 1/2008 | Isogai | H04N 1/0035 399/81 |
| 2016/0219165 A1* | 7/2016 | Iezaki | G02B 27/0172 |

FOREIGN PATENT DOCUMENTS

JP 2005-018288 1/2005

* cited by examiner

*Primary Examiner* — Sandra Brase
(74) *Attorney, Agent, or Firm* — Amin, Turocy & Watson LLP (57) ABSTRACT

According to one embodiment, there is provided an image processing apparatus which is provided with an application controller, a display unit, and a controller. The application controller executes an application. The display unit configured to display display information which indicates that an error is generated when the application is not normally executed. The controller configured to determine a display location of the display information in accordance with a process state of the application when the error is generated.

4 Claims, 8 Drawing Sheets

| USER IDENTIFIER | AUTHENTICATION INFORMATION |
|---|---|
| A12345 | lcoap39fh |
| A12346 | mcjwsyqodg |
| ... | ... |
| A13000 | 0ekcuscwg |

FIG. 9

IMAGE PROCESSING APPARATUS AND INFORMATION PROVIDING METHOD

CROSS-REFERENCE TO RELATED APPLICATIONS

This application is based upon and claims the benefit of priority from Japanese Patent Application No. 2017-020373, filed Feb. 7, 2017, the entire contents of which are incorporated herein by reference.

FIELD

Embodiments described herein relate generally to an image processing apparatus and an information providing method.

BACKGROUND

An application which is additionally installed later in an image processing apparatus is referred to as a plug-in application. In the related art, a user is not notified of an event of an error, warning, or the like generated in a background process, which is executed without being displayed on a display, in the plug-in application. Therefore, the user confirms a result of the background process by displaying a log on the display, or the like of the image processing apparatus. Accordingly, the user is not noticed even when the event is generated, and an expected result may not be obtained.

SUMMARY

According to one embodiment, there is provided an image processing apparatus which is provided with an application controller, a display unit, and a controller. The application controller executes an application. The display unit configured to display display information which indicates that an error is generated when the application is not normally executed. The controller configured to determine a display location of the display information in accordance with a process state of the application when the error is generated.

DETAILED DESCRIPTION

An object of exemplary embodiments described herein is to provide an image processing apparatus and an information providing method which are capable of obtaining an expected result of a user.

In general, according to one embodiment, the image processing apparatus is provided with an application controller, a display, and a controller. The application controller executes an application. The display configured to display display information which indicates that an error is generated when the application is not normally executed. The controller configured to determine a display location of the display information in accordance with a process state of the application when the error is generated.

Hereinafter, the image processing apparatus and the information providing method of the embodiments will be described with reference to drawings.

First Embodiment

Figure 1:
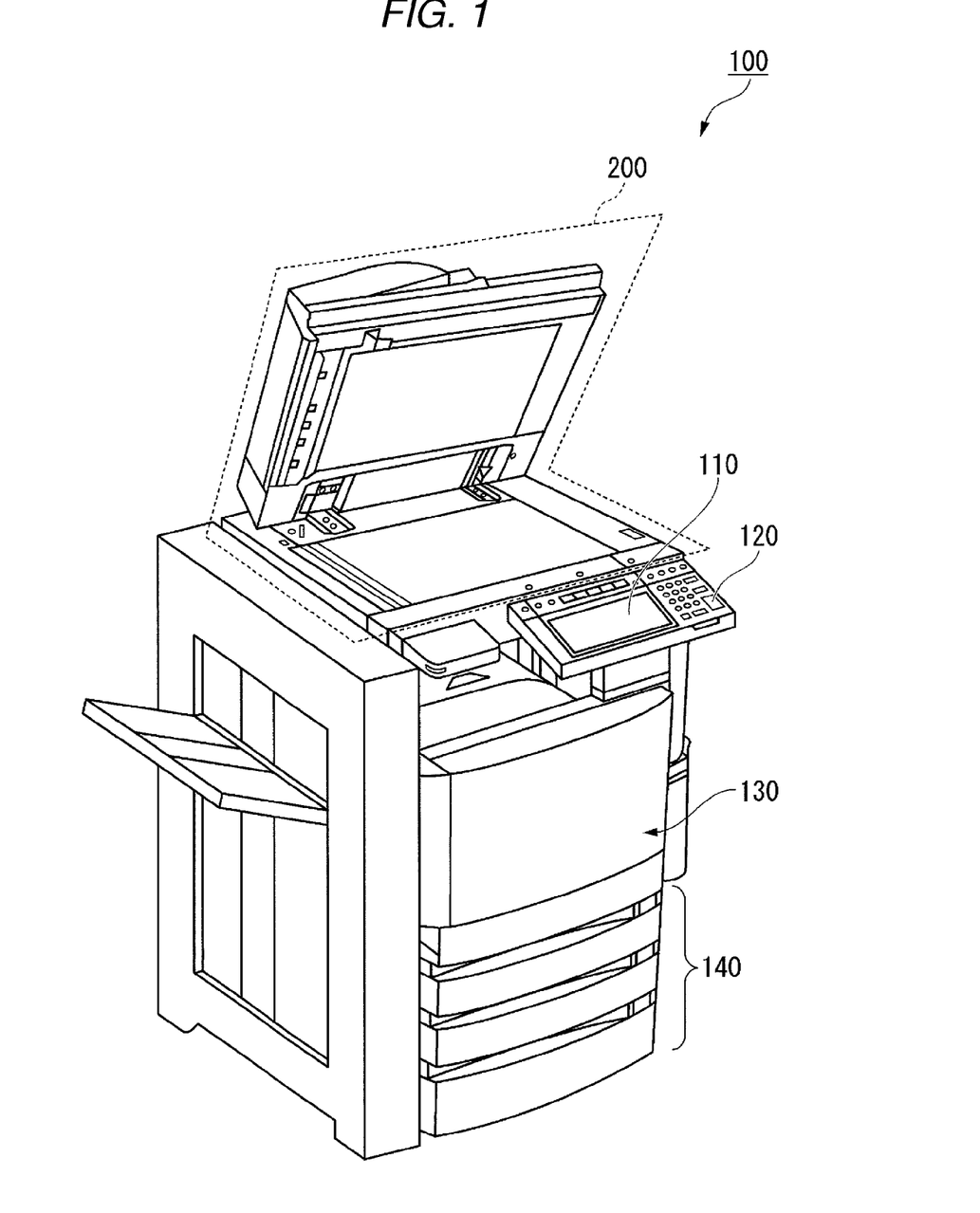
FIG. 1 is an exterior view illustrating an example of an entire configuration of an image processing apparatus of a first embodiment.

FIG. 1 is an exterior view illustrating an example of an entire configuration of an image processing apparatus 100 of a first embodiment. The image processing apparatus 100 is, for example, a complex machine. The image processing apparatus 100 is provided with a display 110, a control panel 120, a printer unit 130, a sheet accommodating unit 140, and an image reading unit 200. Also, the printer unit 130 of the image processing apparatus 100 may be a device for fixing a toner image, and may be an ink jet type device.

The image processing apparatus 100 generates digital data by reading an image shown on a sheet, and generates an image file. The sheet is, for example, an original document, or paper in which letters or images are disclosed. As the sheet, any sheet may be used as long as the image processing apparatus 100 is capable of reading the sheet.

The display 110 is an image display device such as a liquid crystal display, or an organic electro luminescence (EL) display. The display 110 displays various information relating to the image processing apparatus 100. The display 110 is an aspect of a display unit.

The control panel 120 includes a plurality of buttons. The control panel 120 receives operations of a user. The control panel 120 outputs a signal in accordance with the operation executed by the user to a controller of the image processing apparatus 100. Also, the display 110 and the control panel 120 may be configured as an integral touch panel. The control panel 120 is an aspect of an operating unit.

The printer unit 130 forms an image on the sheet based on image information generated by the image reading unit 200 or image information received through a communication passage. The printer unit 130 forms the image by, for example, processes to be described later. An image forming unit of the printer unit 130 forms an electrostatic latent image on a photoconductive drum based on the image information. The image forming unit of the printer unit 130 forms a visible image by attaching a developing agent on the electrostatic latent image. As a specific example of the developing agent, there is a toner. A transferring unit of the printer unit 130 transfers the visible image on the sheet. A fixing unit of the printer unit 130 fixes the visible image on the sheet by heating and pressurizing the sheet. Also, the sheet on which the image is formed may be a sheet accommodated in the sheet accommodating unit 140, and may be a sheet made of resin.

The sheet accommodating unit 140 accommodates the sheet which is used for forming an image in the printer unit 130.

The image reading unit 200 reads the image information of an object to be read as light and shade of light. The image reading unit 200 records the read image information. The recorded image information may be transmitted to another information processing apparatus through a network. The recorded image information may be formed on the sheet as an image by the printer unit 130.

Figure 2:
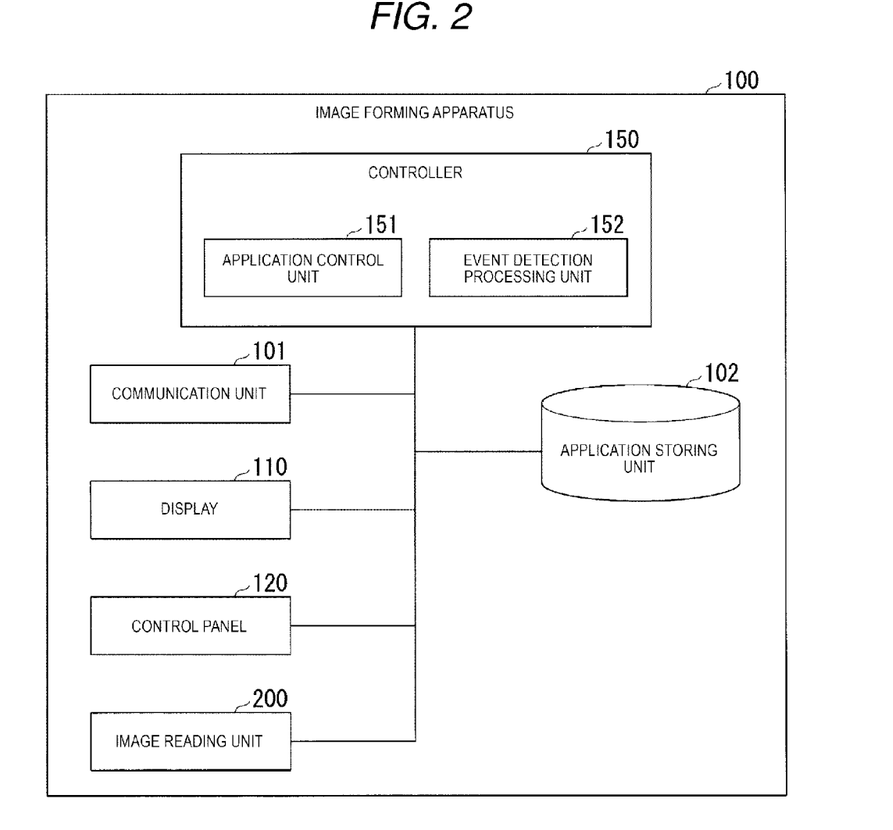
FIG. 2 is a functional block diagram illustrating a configuration of an event detection function of the image processing apparatus of the first embodiment.

FIG. 2 is a functional block diagram illustrating a configuration of an event notification function of the image processing apparatus 100 of the first embodiment. The image processing apparatus 100 is provided with a communicating unit 101, an application storage unit 102, the display 110, the control panel 120, the printer unit 130, a controller 150, and an image reading unit 200. Also, configurations of the display 110, the control panel 120, and the image reading unit 200 are the same as description above, detailed description thereof will be omitted.

The communicating unit 101 is a network interface. The communicating unit 101 is communicatably connected to an information processing apparatus (not illustrated) capable of directly communicating, which is different from the image processing apparatus 100, through a network. The information processing apparatus is an apparatus such as a personal computer or a server. The communicating unit 101 may perform communication in a communication method, for example, local area network (LAN) or Bluetooth (registered trademark).

The application storage unit 102 is constituted by a storage device such as a magnetic hard disk device or a semiconductor storage device. The application storage unit 102 stores various plug-in applications. The plug-in application is an application which is additionally installed in the image processing apparatus 100. The plug-in application includes at least two types of a home application and a background application. The plug-in application is an aspect of the application.

The plug-in application stored in the application storage unit 102 is executed by an application controller 151. When processing of the plug-in application is finished, a log in accordance with a processing result is stored in the application storage unit 102. For example, when processing of the plug-in application is normally finished, a log indicating that the application is normally finished is stored in the application storage unit 102. With respect that, if the application is not normally finished, a log indicating that the application is not normally finished is stored in the application storage unit 102. A user can understand whether or not the plug-in application is normally finished with reference to the logs. The logs may be recorded when the event detection process is performed by an event detection processing unit 152. In the event detection process, for example, when an error of the plug-in application is generated, a state in which communication with another information processing apparatus cannot be performed is detected. In the event detection process, any state may be detected if the plug-in application is not normally operated.

The home application of the embodiment is an application in accordance with a screen display of the display of the image processing apparatus 100. That is, during executing the home application, a screen based on a function of the application is displayed on the display 110. Also, during executing the home application, the screen of the home application which is executing may not always displayed on the display 110. The home application may be executed without being displayed on the display 110, for example, when processes for receiving operations from a user are completely finished. Here, a process in accordance with the screen display during executing the application is set to a foreground process, and a process which does not accompany the screen display is set to a background process. In the home application, an application, such as a Scan to Cloud application, or the like which stores an original document read by the image reading unit 200 in a server of a cloud, is included.

The Scan to Cloud application is started through the display 110 of the image processing apparatus 100 by the user. When the Scan to Cloud application is started, a screen relating to selection of a reading method such as color and monochrome, or designation of a server which becomes a storage destination is displayed. After that, when the user performs operation on the screen, the image reading unit 200 reads the original document. When reading of the original document is finished, a message indicating that reading is correctly finished is displayed on the screen. After that, the application controller 151 closes the screen of the Scan to Cloud application, and for example, moves to a home screen. While the screen of the Scan to Cloud application is not displayed, the application controller 151 transmits image data of the read original document to the server of the cloud. As a subsequent process, for example, there are a process when transmission to the server of the cloud by the application controller 151 is finished, a process of which the application controller 151 stores a processed result in the application storage unit 102 as a log, and a process of which the application controller 151 finishes the Scan to Cloud. That is, in an example of the above described Scan to Cloud application, the foreground process means a process from starting the application to processing of reading completion, and the background process means a process after the process in which the read image data is transmitted to the server.

Meanwhile, the background application is an application which does not accompany the screen display on the display 110 of the image processing apparatus 100. That is, the background applications is an application being executed in the background process. When the background application is started by the user, a random access memory (RAM) reads the application. When RAM reads the application, the background application is executed without being displayed on the display 110. The background application does not require an instruction corresponding to execution from the user. The background application is, for example, an application which regularly collects log information, and the like from a plurality of the image processing apparatuses 100 being connected to a network, and transmits the information to a management server.

The controller 150 controls an operation of each unit of the image processing apparatus 100. The controller 150 is executed by a device provided with, for example, a central processing unit (CPU) and a RAM. The controller 150 functions as the application controller 151 and the event detection processing unit 152 by executing a control program of the image processing apparatus.

The application controller 151 executes the plug-in application stored in the application storage unit 102 through operations of the user. If the plug-in application being executed is the home application, the application controller 151 allows the display 110 to display a user interface (UI) of the plug-in application. The user inputs instructions to the application controller 151 by operating the UI. The application controller 151 executes the home application according to the instruction of the user. The application controller 151 may execute the application according to a process state of the home application without displaying the state on the display 110. If the plug-in application is the background application, the application controller 151 executes the background application without displaying the UI on the display 110. The application controller 151 may execute a plurality of the plug-in applications at the same time.

The event detection processing unit 152 executes the event detection process according to a process state of the plug-in application by the application controller 151. An event of the plug-in application is detected in the event detection process. The event indicates information output from the plug-in application when the plug-in application is not normally executed. When the event detection process is executed, a part displaying display information which indicates that the event is generated is turned on in the display 110. The user can select the display information through the control panel 120. When the display information is selected, the event detection processing unit 152 allows the display 110 to display detailed information of the event. The detailed information is displayed on the basis of the log stored in the application storage unit 102.

Figure 3:
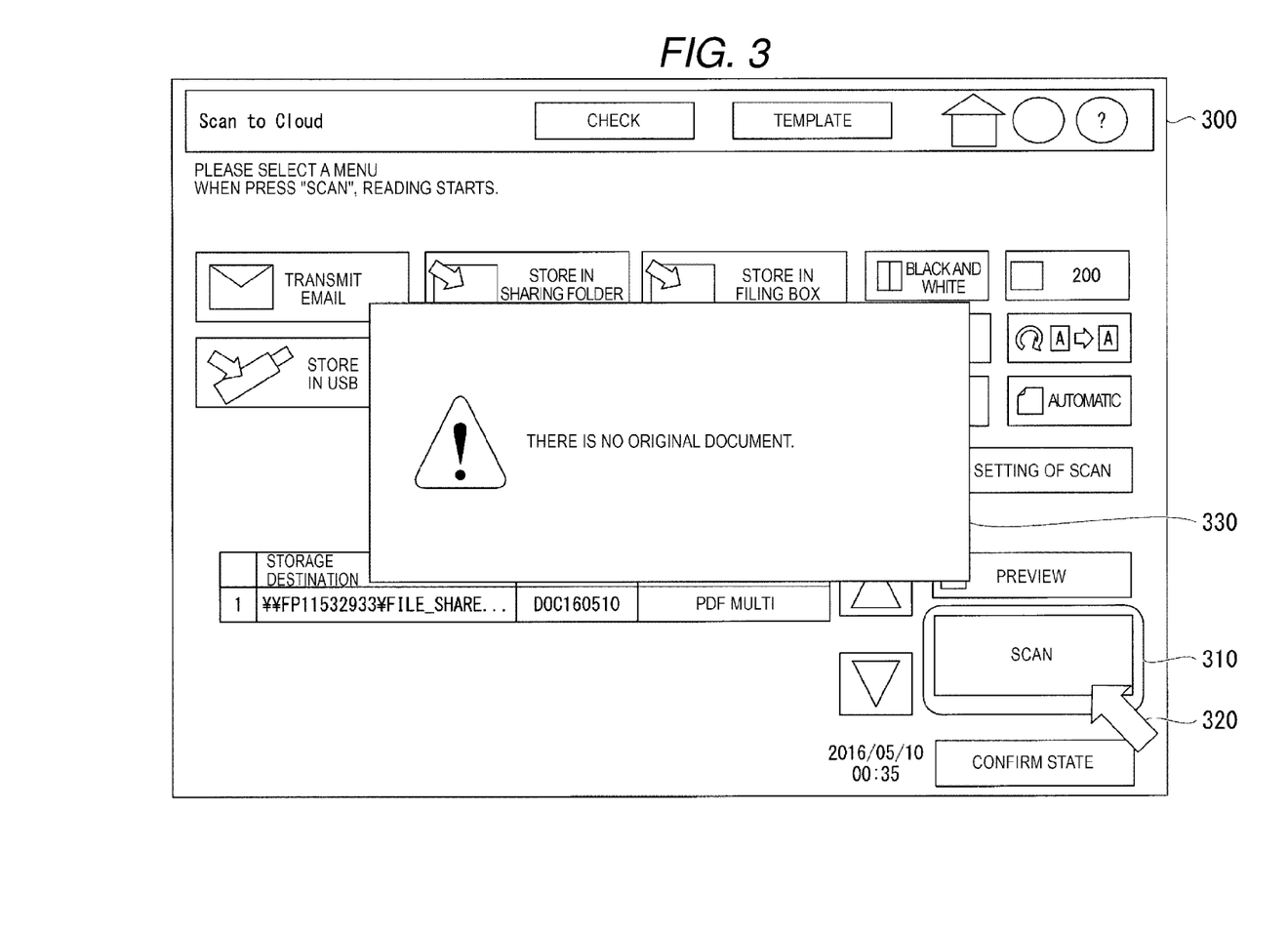
FIG. 3 is a diagram illustrating a specific example of a state in which an error is displayed during a foreground process of the first embodiment.

FIG. 3 is a diagram illustrating a specific example of a state in which an error is displayed during the foreground process of the first embodiment. A region 300 indicates a screen being displayed on the display 110. The region 300 displays an icon of each application. In a region 310, an icon for instructing the image processing apparatus 100 to read the image is displayed. When the user selects the icon displayed on the region 310 through the control panel 120, the image reading unit 200 reads the image. An arrow 320 is an icon indicating that the user selects the region 310. The arrow 320 is displayed, for example, when the user selects the region 310. A region 330 is an error image being displayed during the foreground process. When the region 310 is selected, the region 330 is displayed if an original document is not disposed in the image reading unit 200. The region 330 is displayed so as to overlap with the icons indicating the application. An error image which is displayed so as to overlap with the icons is referred to as a "first icon". The first icon is an icon showing an error content. The error image may be displayed without being limited to a case in which the original document is not disposed in the image reading unit 200. For example, the error image may be displayed when a sheet is not accommodated in the sheet accommodating unit 140 at the time of forming the image. The first icon is an aspect of the display information. The error is an aspect of the event.

Figure 4:
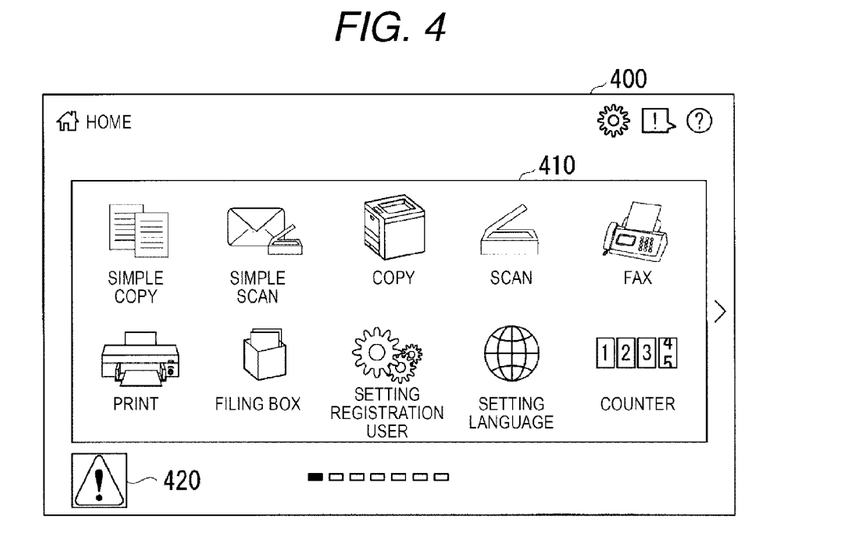
FIG. 4 is a diagram illustrating a specific example of a state in which an event detection process is executed during a background process of the first embodiment.

FIG. 4 is a view illustrating a specific example of a state in which the event detection process is performed during the background process of the first embodiment. A region 400 indicates a screen being displayed on the display 110. The region 400 displays an icon of each application. In a region 410, each icon of the application can be executed by the image processing apparatus 100 is displayed. In the application displayed on the region 410, an application initially installed with the plug-in application is included. The region 420 displays the display information being displayed at the time of executing the event detection process.

When the user selects the display information displayed on the display 110, the detailed information of the event by the event detection processing unit 152 can be displayed on the display 110. Although a predetermined color is given to the display information of the region 420, according to the content of the event, the color of the display information may be changed. For example, red may indicate a state of stop of the plug-in application due to generation of an event, and yellow may indicate a state in which the event is generated but the plug-in application is continuously executed. In this example, the display information is displayed on a lower left side of the region 400, but may be displayed on another location such as a lower right side. The display information may be flashed and displayed when the information is displayed on the display 110. When the display information is flashed and displayed, even if a resolution of the display 110 is low, the user easily notices that the event is generated.

As described above, when the event detection process is executed during the background process, compared to a case in which the event detection process is executed during the foreground process, the image thereof becomes small. Specifically, the image is displayed so as not to overlap with the icons indicating the applications. The error image which is displayed not to overlap with the icons is referred to as a second icon. The second icon is an icon indicating generation of the error. During the background process, there is a case in which a user different from the user who executes the background process uses the image processing apparatus 100. Therefore, if the image is displayed during the foreground process in the same manner as that of the event detection process, a user is confused who is not related to the background process and currently uses this apparatus. The second icon is an aspect of the display information.

Figure 5:
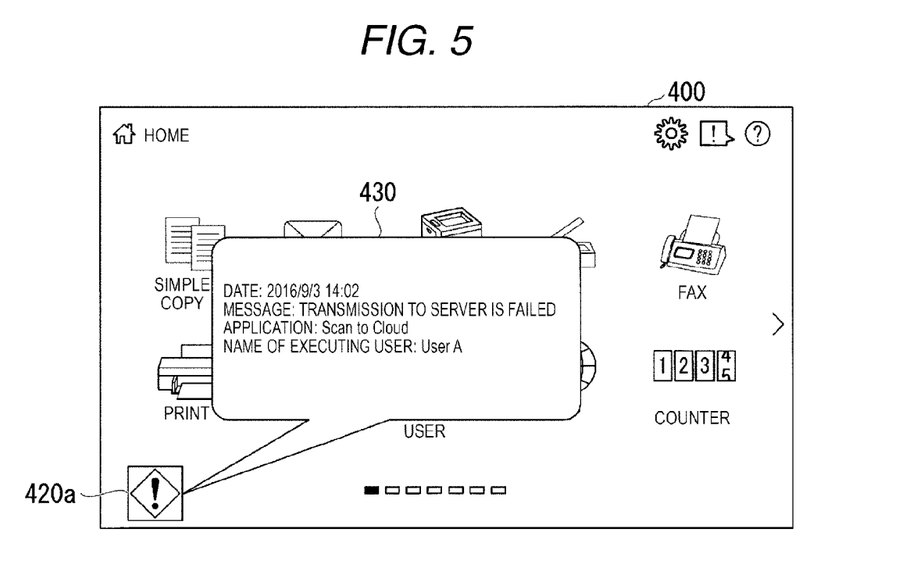
FIG. 5 is a diagram illustrating a specific example of a state in which detailed information of the event is displayed of the first embodiment.

FIG. 5 is a diagram illustrating a specific example of a state in which the detailed information of the event of the first embodiment is displayed. The region 400 indicates a screen displayed on the display 110. The region 420a indicates a second icon being displayed at the time of executing the event detection process. The user selects the second icon displayed on the display 110, and thus the detailed information of the event detected by the event detection processing unit 152 can be displayed on the display 110. A region 430 indicates the detailed information of the event.

The detailed information of the event shows a date, a message, an application, and a name of an execution user. The date means a date when the event is generated. The region 430 shows that the date is "2016/9/3 14:02". The message shows a content of the generated event. The region 430 shows the event of "transmission to the server is failed". The application indicates a name of the plug-in application. In the region 430, the application displays "Scan to Cloud". The name of the execution user indicates an account name of a user who executes the plug-in application. In the region 430, the name of the execution user is displayed as a "User A". Accordingly, with reference to the detailed information of the event, it is found that the application which is so called Scan to Cloud executed by the User A fails to transmit the message to the server at 14:02, in Sep. 3, 2016. Also, the detailed information of the event illustrated in FIG. 5 is only one specific example. Therefore, the detailed information of the event may be configured to be different from that of FIG. 5. For example, the detailed information of the event may show a solving method of the event.

Figure 6:
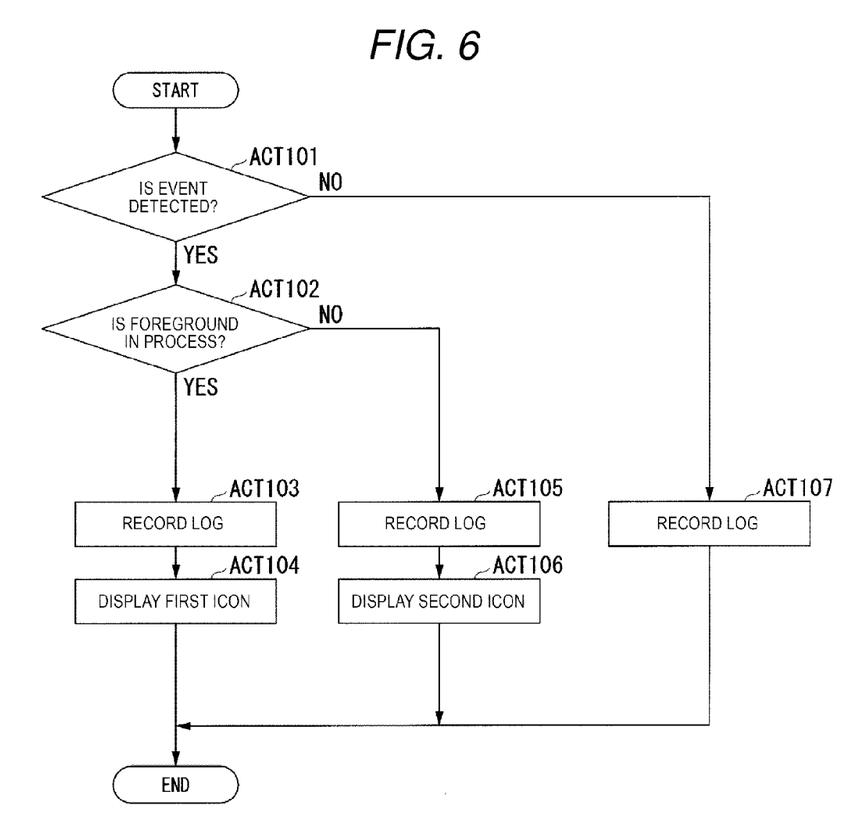
FIG. 6 is a flow chart illustrating flowing of the event detection process during executing an application of the first embodiment.

FIG. 6 is a flow chart illustrating flowing of the event detection process during executing the application of the first embodiment. The event detection processing unit 152 detects whether or not the event is generated during executing the application (ACT 101). If generation of the event is detected in the application (YES in ACT 101), the application controller 151 determines whether or not the application is in the foreground process (ACT 102). If the application is determined to be in the foreground process (YES in ACT 102), the application controller 151 records a log indicating that the application is not normally finished in the application storage unit 102 (ACT 103). Next, the event detection processing unit 152 allows the display 110 to display the first icon indicating generation of the event, and the process is finished (ACT 104). If the application is determined not to be in the foreground process (NO in ACT 102), that is, the application is determined to be in the background process, the application controller 151 records a log indicating that the application is not normally finished in the application storage unit 102 (ACT 105). Next, the event detection processing unit 152 allows the display 110 to display the second icon indicating generation of the event, and the process is finished (ACT 106). If it is not detected that the event is generated in the application (NO in ACT 101), the application controller 151 records a log indicating that the application is normally finished in the application storage unit 102, and the process is finished (ACT 107).

In the image processing apparatus 100 configured as described above, if the event is generated, generation of the event is displayed on the display 110 by the event detection processing unit 152. Therefore, the user can quickly notice that the event is generated by viewing the display 110. Therefore, the user can obtain an expected result more rapidly than before.

Second Embodiment

Figure 7:
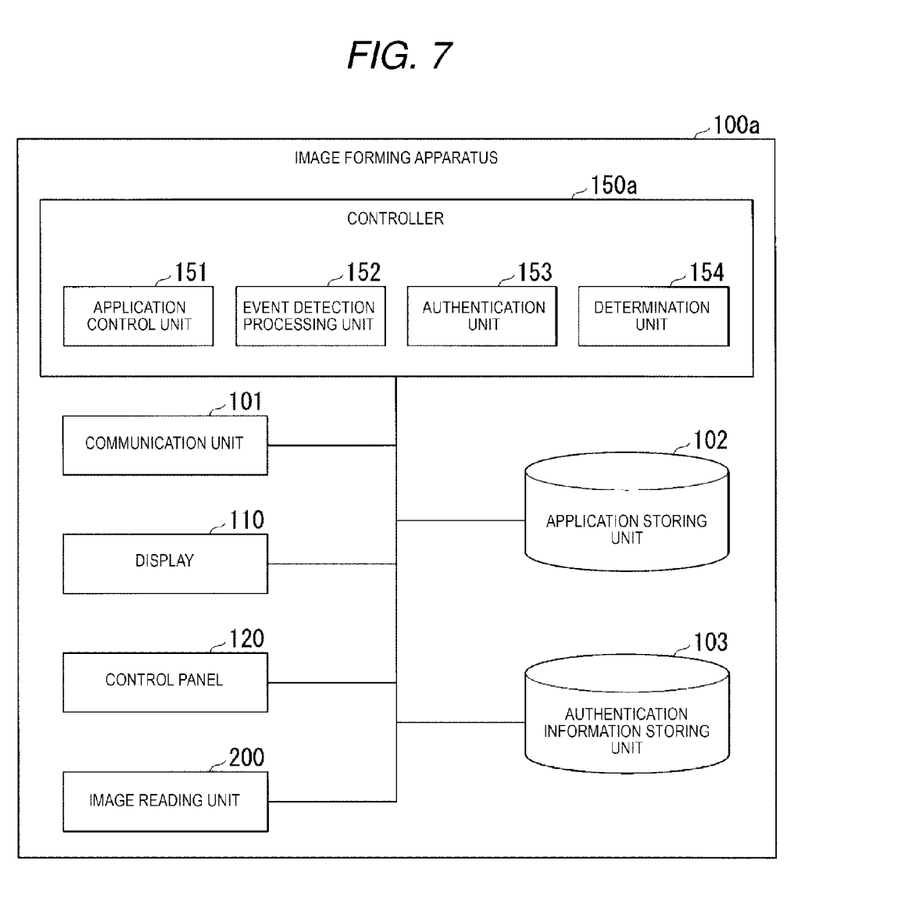
FIG. 7 is a functional block diagram illustrating a configuration of an event notification function of an image processing apparatus of a second embodiment.

Next, an image processing apparatus 100a in a second embodiment will be described. FIG. 7 is a functional block diagram illustrating a configuration of the event notification function of the image processing apparatus 100a of the second embodiment. The image processing apparatus 100a in the second embodiment is different from that of the first embodiment in that a controller 150a is provided instead of the controller 150 and an authentication information storage unit 103 is further included, but other configurations are the same. Hereinafter, points of the second embodiment different from those of the first embodiment will be described.

The authentication information storage unit 103 is configured using a storage device such as a magnetic hard disk device or a semiconductor storage device. The authentication information storage unit 103 stores a authentication information table. The authentication information table stores a user identifier and authentication information. The user identifier is information such as a character string, a number, or a combination of the number and character string. The user identifier may be any information as long as the information does not overlap with another user identifier. The authentication information is information such as a character string, a number, or a combination of the number and character string.

The controller 150a controls an operation of each unit of the image processing apparatus 100a. The controller 150a is performed by, for example, an apparatus including a CPU and RAM. The controller 150a functions as the application controller 151, the event detection processing unit 152, an authenticating unit 153, and a determining unit 154 by executing a control program of the image processing apparatus. Since the application controller 151 and the event detection processing unit 152 are the same as those of the first embodiment, description thereof will be omitted.

The authenticating unit 153 determines whether or not the user identifier and the authentication information received through the control panel 120 from the user satisfy a predetermined condition. The predetermined condition means that, for example, the received user identifier and authentication information coincide with a user identifier and authentication information stored in the authentication information storage unit 103. If the user identifier and the authentication information satisfy the predetermined condition, the authenticating unit 153 determines that the user has a legitimate authority. When it is determined that the user has the legitimate authority, the user can input instruction to the image processing apparatus 100a through the control panel 120. A state, in which it is determined that the user has the legitimate authority, is referred to as "logging in". If the user identifier and the authentication information do not satisfy the predetermined condition, the authenticating unit 153 determines that the user does not have the legitimate authority. When it is determined that the user does not have the legitimate authority, the user cannot input the instruction to the image processing apparatus 100a through the control panel 120.

When the event is detected during the background process, the determining unit 154 determines whether or not a user executing the background process and a user during logging in are the same. Specifically, the determining unit 154 determines whether or not the user identifier of the user executing the background process and the user identifier of the user during logging in coincide with each other. If the user identifiers coincide with each other, the event detection processing unit 152 allows the display 110 to display the first icon. If the user identifiers do not coincide with each other, the event detection processing unit 152 allows the display 110 to display the second icon.

Figure 8:
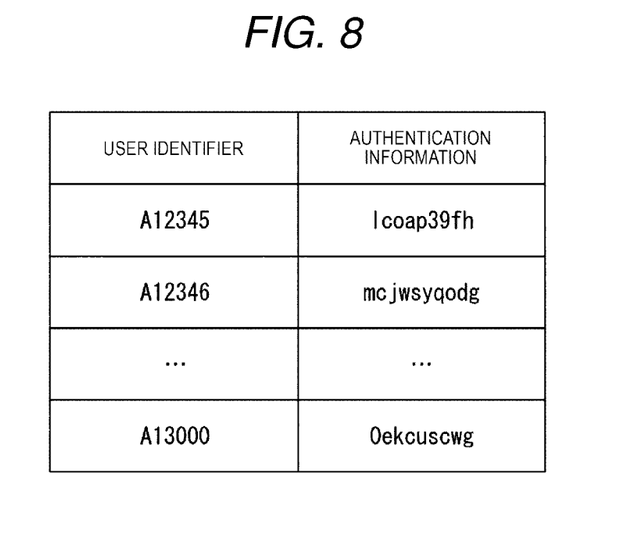
FIG. 8 is a diagram illustrating a specific example of an authentication information table of the second embodiment.

FIG. 8 is a diagram illustrating a specific example of the authentication information table of the second embodiment. The authentication information table includes an authentication information record. The authentication information record includes, each value of the user identifier and the authentication information. In an example illustrated in FIG. 8, a record in an uppermost column of the authentication information table shows that a value of the user identifier is "A12345", and a value of the authentication information is "lcoap39fh". According to the record in the uppermost of the authentication information table, the user identifier received from the control panel 120 is "A12345", and if the authentication information is "lcoap39fh", the both authentication information coincide with each other. Also, the authentication information table illustrated in FIG. 8 is only a specific example. Therefore, the authentication information table may be configured to be different from that of FIG. 8. For example, the authentication information table may have an expiration date of the authentication information. Moreover, the image processing apparatus 100 may receive the user identifier and the authentication information from a card leader, or the like instead of the control panel 120.

Also, when the event of the background process during being used by another user is detected, and the user executing the background process logs in after the second icon is displayed, the first icon is displayed right after the user logged in.

Figure 9:
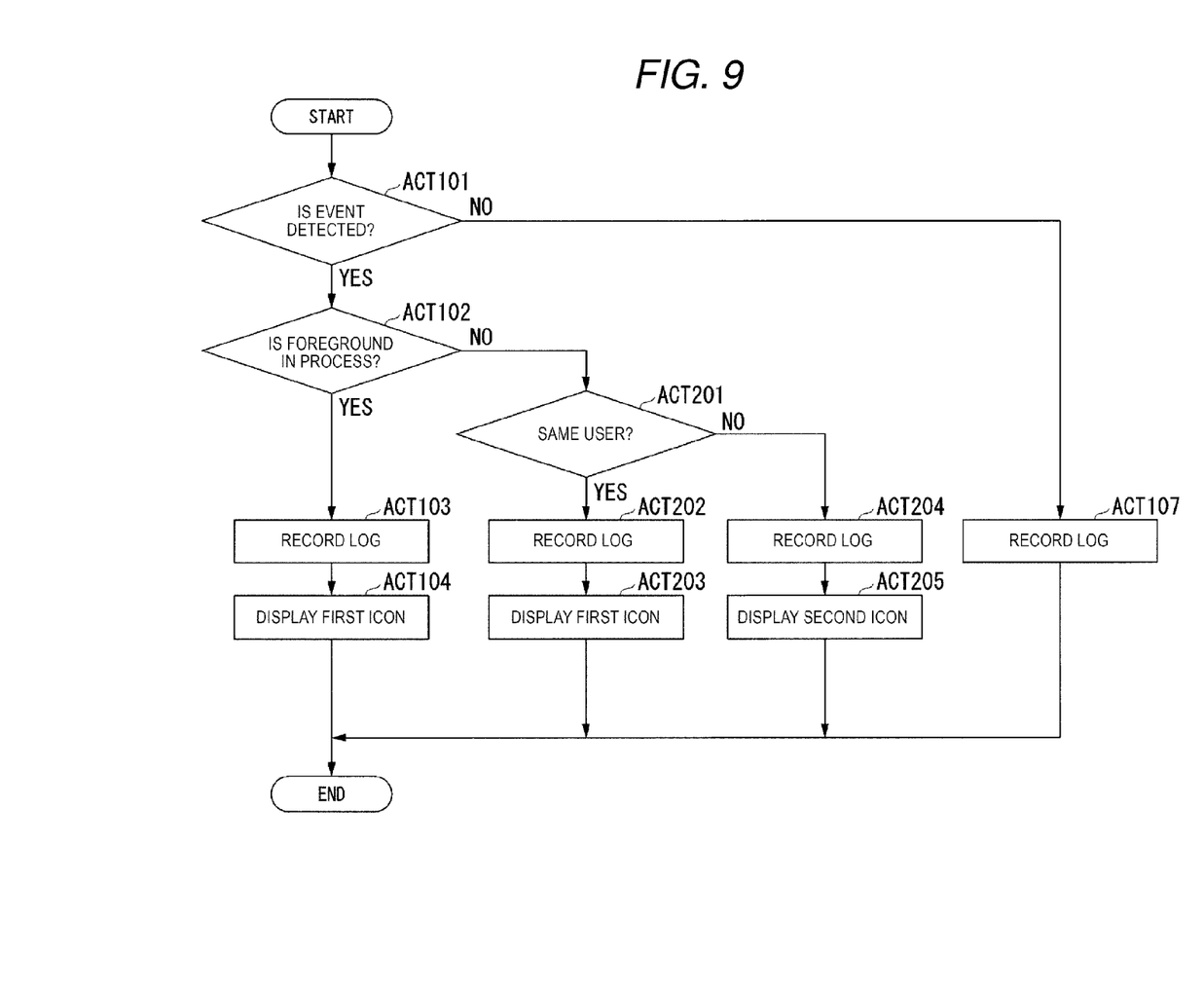
FIG. 9 is a flow chart illustrating flowing of the event detection process during executing the application of the second embodiment.

FIG. 9 is a flow chart illustrating flowing of the event detection process during executing the application of the second embodiment. The event detection processing unit 152 detects whether or not the event is generated in the application during executing (ACT 101). If it is detected that the event is generated in the application (YES in ACT 101), the application controller 151 determines whether or not the application is in the foreground process (ACT 102). If it is determined that the application is in the foreground process (YES in ACT 102), the application controller 151 records a log indicating that the application is not normally finished in the application storage unit 102 (ACT 103). Next, the event detection processing unit 152 allows the display 110 to display the first icon indicating generation of the event, and the process is finished (ACT 104).

If it is determined that the application is not in the foreground process (NO in ACT 102), the determining unit 154 determines whether or not the user executing the background process and the user during logging in coincide with each other (ACT 201). If the users are the same as each other (YES in ACT 201), the application controller 151 stores a log indicating that the application is not normally finished in the application storage unit 102 (ACT 202). Next, the event detection processing unit 152 allows the display 110 to display the first icon indicating generation of the event, and the process is finished (ACT 203).

If the users are not the same (NO in ACT 201), the application controller 151 stores the log indicating that the application is not normally finished in the application storage unit 102 (ACT 204). Next, the event detection processing unit 152 allows the display 110 to display the second icon indicating that the event is generated, and the process is finished (ACT 205). If it is not detected that the event is generated in the application (NO in ACT 101), the application controller 151 records the log indicating that the application is normally finished in the application storage unit 102, and the process is finished (ACT 107).

In the image processing apparatus 100a configured as described above, if the event is generated, the determining unit 154 determines whether or not the user during logging in and the user executing the background process are the same. The event detection processing unit 152 determines an icon being displayed in accordance with a determined result. Therefore, if the user during logging in is the same as the user executing the background process, the first icon is displayed, and thus the user can quickly notice the generation of the event. With respect that, if the user during logging in is not the same as the user executing the background process, the second icon is displayed, and thus the user can operate the image processing apparatus 100a without being interrupted by the second icon.

According to at least one of the embodiments described above, since the image processing apparatus 100 is provided with the event detection processing unit 152, the user can obtain the expected result more quickly than before.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
an application controller that executes an application;
a display configured to display display information indicating generation of an error when the application is not normally executed; and
a controller configured to determine a display location of the display information in accordance with a process state of the application when the error is generated,
wherein the controller is configured to determine the display location of the display information based on whether or not the application executes a display process on the display unit at the time of error generation.

2. The apparatus according to claim 1,
wherein the controller configured to allow the display unit to display a first icon indicating a content of the error, when the application executes the display process on the display unit at the time of the error generation.

3. The apparatus according to claim 1,
wherein the controller configured to allow the display unit to display a second icon indicating that the error is generated, when the application does not execute the display process on the display unit at the time of the error generation.

4. The apparatus according to claim 3, further comprising:
an operation unit configured to receive an operation of the second icon displayed on the display unit by a user,
wherein the controller configured to display detailed information indicating a content of the error in accordance with the operation.

* * * * *